United States Patent
Coady et al.

(10) Patent No.: US 12,412,116 B2
(45) Date of Patent: Sep. 9, 2025

(54) PUSH NOTIFICATION QUBIT MANIPULATION

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 987 days.

(21) Appl. No.: 17/513,308

(22) Filed: Oct. 28, 2021

(65) Prior Publication Data

US 2023/0133503 A1 May 4, 2023

(51) Int. Cl.
G06N 10/80 (2022.01)
G06N 10/20 (2022.01)
G06N 10/40 (2022.01)

(52) U.S. Cl.
CPC ............ *G06N 10/80* (2022.01); *G06N 10/20* (2022.01); *G06N 10/40* (2022.01)

(58) Field of Classification Search
None
See application file for complete search history.

(56) References Cited

U.S. PATENT DOCUMENTS

| | | | |
|---|---|---|---|
| 7,518,120 | B2 | 4/2009 | Monroe et al. |
| 8,386,899 | B2 | 2/2013 | Goto et al. |
| 8,897,449 | B1 | 11/2014 | Broadbent |
| 10,826,845 | B2 | 11/2020 | Dadashikelayeh et al. |
| 2015/0163178 | A1* | 6/2015 | Jeon ............... H04L 67/55 709/206 |
| 2017/0093943 | A1* | 3/2017 | Alsina .............. H04L 67/55 |
| 2019/0042264 | A1* | 2/2019 | Zou .................. G06F 9/30 |
| 2019/0179730 | A1* | 6/2019 | Geller ............. G06F 11/3698 |
| 2021/0112130 | A1 | 4/2021 | LeClair et al. |
| 2021/0390439 | A1* | 12/2021 | Ramasamy .......... G06N 10/60 |
| 2022/0405626 | A1* | 12/2022 | Naveh ............... G06N 10/00 |
| 2023/0034075 | A1* | 2/2023 | Griffin .............. G06N 10/00 |
| 2023/0129967 | A1* | 4/2023 | Oh .................. G06N 10/80 706/62 |

(Continued)

FOREIGN PATENT DOCUMENTS

WO 2021055999 A2 3/2021

OTHER PUBLICATIONS

Aharonov, D. et al., "Interactive Proofs for Quantum Computations," arXiv:1704.04487v1 [quant-ph], Apr. 14, 2017, 75 pages.

(Continued)

*Primary Examiner* — Ryan Barrett
(74) *Attorney, Agent, or Firm* — Dority & Manning, P.A.

(57) ABSTRACT

Performing qubit manipulation using push notifications is disclosed herein. In one example, a quantum computing device comprises a system memory and a processor device communicatively coupled to the system memory. The processor device is to receive a push notification that includes an identifier of a qubit and a push notification payload, such as a data value to be written to the qubit and/or one or more qubit manipulation commands to be performed using the qubit. Upon receiving the push notification, the processor device obtains write access to the qubit, and then applies the push notification payload to the qubit, for example by writing the data value to the qubit and/or by executing the one or more qubit manipulation commands using the qubit.

17 Claims, 7 Drawing Sheets

(56) References Cited

U.S. PATENT DOCUMENTS

| | | | |
|---|---|---|---|
| 2023/0139281 A1* | 5/2023 | Coady | G06F 12/0246 |
| | | | 716/100 |
| 2023/0196175 A1* | 6/2023 | Griffin | G06F 9/4868 |
| | | | 706/62 |
| 2023/0244972 A1* | 8/2023 | Griffin | G06N 10/80 |
| | | | 706/62 |
| 2024/0020561 A1* | 1/2024 | Coady | G06N 10/20 |

OTHER PUBLICATIONS

Han, J. et al., "Enhancing Data and Privacy Security in Mobile Cloud Computing through Quantum Cryptography," 7th IEEE International Conference on Software Engineering and Service Science (ICSESS), Aug. 26-28, 2016, Beijing, China, IEEE, pp. 398-401.

* cited by examiner

PUSH NOTIFICATION QUBIT MANIPULATION

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently manipulate and configure qubits will be desirable.

SUMMARY

The examples disclosed herein implement a push notification service for performing qubit manipulation using push notifications. The push notification service, executing on a quantum computing device, receives a push notification that identifies a qubit and includes a push notification payload, and, in response, applies the push notification payload to the qubit. In this manner, a data value and/or a quantum state of the qubit may be manipulated or configured to prepare the qubit for use and/or to propagate a result of a previous quantum operation.

In one example, a method for performing qubit manipulation using push notifications is disclosed. The method comprises receiving, by a first quantum computing device, a push notification comprising an identifier of a qubit and a push notification payload. The method further comprises obtaining write access to the qubit. The method also comprises applying the push notification payload to the qubit.

In another example, a computing system comprising a first quantum computing device for performing qubit manipulation using push notifications is disclosed. The quantum computing device comprises a first system memory and a first processor device communicatively coupled to the first system memory. The first processor device is to receive a push notification comprising an identifier of a qubit and a push notification payload. The first processor device is further to obtain write access to the qubit. The first processor device is also to apply the push notification payload to the qubit.

In another example, a non-transitory computer-readable medium is disclosed. The non-transitory computer-readable medium stores thereon computer-executable instructions that, when executed, cause one or more processor devices receive a push notification comprising an identifier of a qubit and a push notification payload. The computer-executable instructions further cause the one or more processor devices to obtain write access to the qubit. The computer-executable instructions further cause the one or more processor devices to apply the push notification payload to the qubit.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first qubit" and "second qubit," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently manipulate and configure qubits will be desirable. In particular, it may be desirable to provide "push" functionality for modifying data values and/or quantum states of qubits to, e.g., prepare the qubits for use in quantum operations, or to propagate a result of a quantum operation using another set of qubits.

In this regard, the examples disclosed herein implement a push notification service for performing qubit manipulation using push notifications. As used herein, the term "push notification" and derivatives thereof are used to refer to a message transmitted from a sender to one or more recipients not as a result of the recipient(s) specifically requesting the transmission, but rather as a result of the recipient subscribing to receive the message at some point in the future. In exemplary operation, the push notification service, executing on a quantum computing device, receives a push notification that includes an identifier of a qubit as well as a push notification payload. The push notification payload may comprise, as non-limiting examples, a data value to be written to the qubit, and/or one or more qubit manipulation commands to be executed using the qubit (e.g., commands for entangling the qubit or setting a quantum state of the qubit). The push notification may be generated and transmitted by another quantum computing device based on a result of a previous quantum operation, or may be generated and transmitted by a classical computing device based on input data (e.g., data values to be stored or qubit manipulation operations to be performed using the qubit).

Upon receiving the push notification, the push notification service obtains write access to the qubit, and then applies the push notification payload to the qubit. In examples in which the push notification payload includes a data value to be written to the qubit, applying the push notification payload to the qubit may comprise obtaining the data value from the push notification payload, and then writing the data value to the qubit. Examples in which the push notification payload includes one or more qubit manipulation commands may provide that applying the push notification payload to the qubit comprises obtaining the one or more qubit manipulation commands from the push notification payload, and then executing the one or more qubit manipulation commands using the qubit.

Some examples may further provide that, after applying the push notification payload to the qubit, the quantum computing device may subsequently execute a quantum service to which the qubit is allocated. In this manner, the push notification service may be used to initialize or pre-configure the qubit for use by the quantum service, and may also enable multiple quantum services to be "daisy-chained," with the results of one quantum service being pushed into qubits in preparation for further quantum computations by another quantum service.

Figure 1:
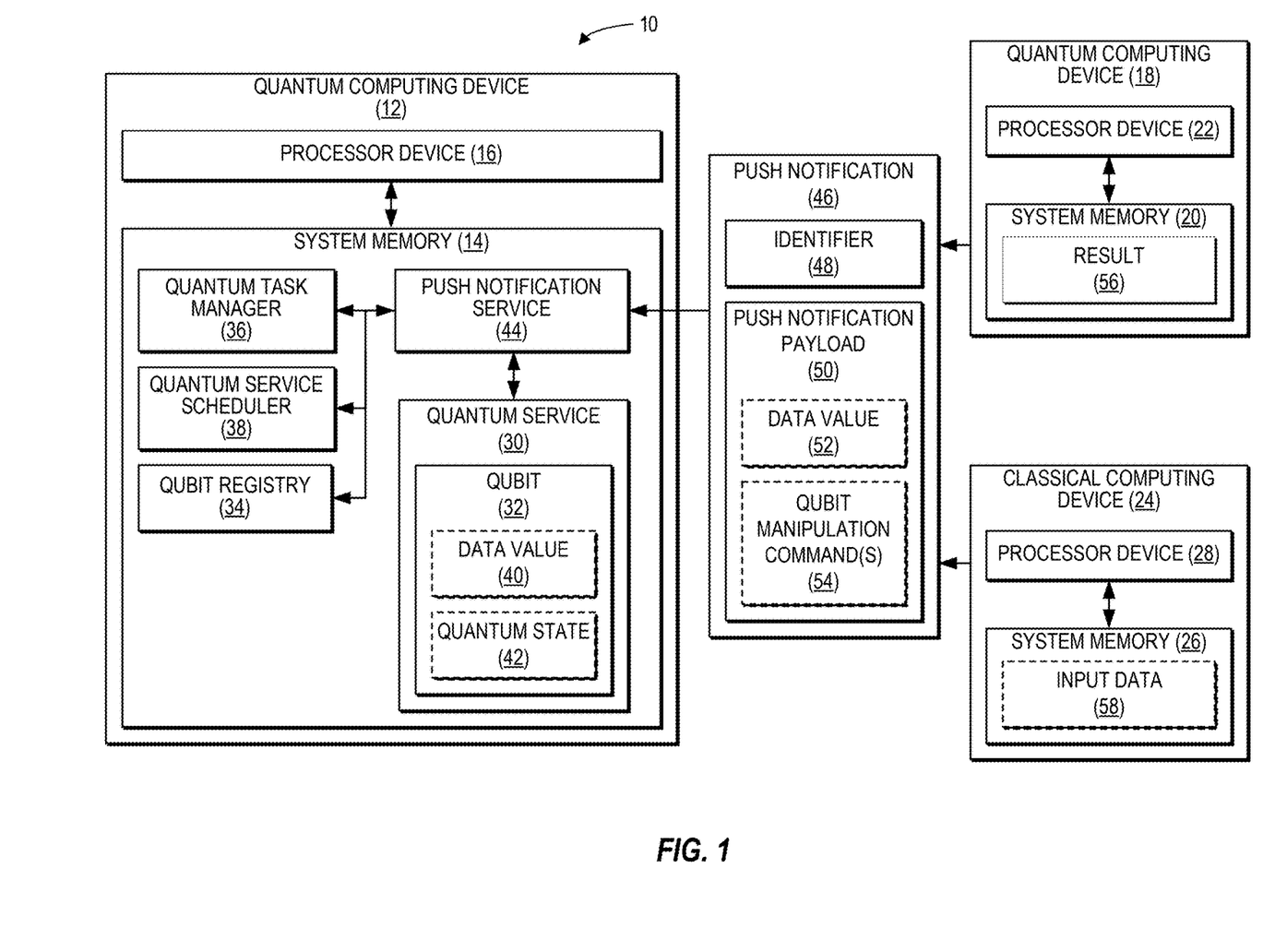
FIG. 1 is a block diagram of a computing system in which examples may be practiced.

FIG. 1 is a block diagram of a computing system 10 according to one example. The computing system 10 includes a quantum computing device 12 that comprises a system memory 14 and a processor device 16; a quantum computing device 18 that comprises a system memory 20 and a processor device 22; and a classical computing device 24 that comprises a system memory 26 and a processor device 28. The quantum computing device 12, the quantum computing device 18, and the classical computing device 24 in the example of FIG. 1 are all communicatively coupled via a classical communications link (not shown), which may comprise a private network or a public network such as the internet. The quantum computing device 12 and the quantum computing device 18 may also be communicatively coupled via a quantum channel (not shown) over which qubits may be transmitted. It is to be understood that the computing system 10, according to some examples, may include more or fewer quantum computing devices and/or classical computing devices than illustrated in FIG. 1. Additionally, the quantum computing device 12, the quantum computing device 18, and/or the classical computing device 24 in some examples may include constituent elements in addition to those illustrated in FIG. 1.

The quantum computing device 12 and the quantum computing device 18 in the example of FIG. 1 operate in quantum environments, but are capable of operating using classical computing principles or quantum computing principles. When using classical computing principles, the quantum computing device 12 and the quantum computing device 18 perform computations that utilize quantum-mechanical phenomena, such as superposition and/or entanglement states. The quantum computing device 12 and the quantum computing device 18 may operate under certain environmental conditions, such as at or near zero degrees (0°) Kelvin. When using classical computing principles, the quantum computing device 12 and the quantum computing device 18 utilize binary digits that have a value of either zero (0) or one (1).

In the example of FIG. 1, the quantum computing device 12 executes a quantum service 30, which comprises a process that employs one or more qubits, such as a qubit 32, to perform quantum operations to provide desired functionality. To maintain information for qubits such as the qubit 32, the quantum computing device 12 may include a qubit registry 34, which comprises a plurality of qubit registry entries each corresponding to a qubit such as the qubit 32. The qubit registry 34 maintains and provides access to data relating to the qubits implemented by the quantum computing device 12, such as a count of the total number of qubits implemented by the quantum computing device 12 and a count of the number of available qubits that are currently available for allocation, as non-limiting examples. Each of the qubit registry entries of the qubit registry 34 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 30 is facilitated by a quantum task manager 36 and a quantum service scheduler 38, which operate in a manner analogous to their conventional classical counterparts. Thus, the quantum task manager 36 of the quantum computing device 12 handles operations for creating, monitoring, and terminating quantum services, while the quantum service scheduler 38 of the quantum computing device 12 controls the scheduling of quantum services for execution by the processor device 16, and the allocation of processing resources to executing quantum services. The functionality of the quantum task manager 36 and the quantum service scheduler 38 may be made accessible to other services and processes (e.g., via a defined application programming interface (API), as a non-limiting example).

The qubit 32 of the quantum service 30 may be used to store a data value 40, and/or may have a quantum state 42 (e.g., spin, as a non-limiting example) into which the qubit 32 is programmatically placed. Circumstances may arise in which it is desirable to pre-configure or initialize the data value 40 and/or the quantum state 42 of the qubit 32. For instance, the quantum service 30 may not be configured to initialize the qubit 32 itself, and/or a result value from a previous quantum operation may need to be propagated to the qubit 32 for use as input to a next quantum operation to be performed by the quantum service 30. In this regard, the quantum computing device 12 of FIG. 1 implements a push notification service 44 for performing qubit manipulation using push notifications. The push notification service 44 in the example of FIG. 1 is communicatively coupled to the quantum task manager 36, the quantum service scheduler 38, and the qubit registry 34, and thus may access data related to qubit allocation and deallocation, qubit state, the use of qubits by executing quantum services, and the current and upcoming state of executing quantum services, as non-limiting examples. The push notification service 44 may comprise a table or other appropriate data structure for tracking quantum services and/or devices, such as the quantum computing device 18 and/or the classical computing device 24, from which the push notification service 44 is configured to receive push notifications, and to validate push notifications received by the push notification service 44.

In exemplary operation, the push notification service 44 receives a push notification 46, which may conform to a predefined format or protocol, over a classical communications link. The push notification 46 includes an identifier 48 of a qubit (e.g., the qubit 32) to which the push notification 46 is directed, and also includes a push notification payload 50. The identifier 48 may comprise a unique identifier corresponding to the qubit 32, or may comprise an identifier of the quantum service 30 to which the qubit 32 is allocated. The push notification payload 50 may comprise, as a non-limiting example, a data value 52 representing a value to be written to the qubit 32. The push notification payload 50 may also or alternatively comprise one or more qubit manipulation commands 54 to be executed using the qubit 32. For instance, the one or more qubit manipulation commands 54 may include a command for entangling the qubit 32, or for setting a quantum state (e.g., spin) of the qubit 32.

In some examples, the push notification 46 may be generated and transmitted by the quantum computing device 18 based on a result 56 of a previous quantum operation carried out by the quantum computing device 18. For example, the result 56 may comprise the data value 52 that is included as part of the push notification payload 50, and that may serve as input for a next quantum operation to be performed by the quantum service 30. According to some examples, the push notification 46 may be generated and transmitted by the classical computing device 24 based on input data 58, which may comprise, for example, the data value 52 to be stored in the qubit 32 or the one or more qubit manipulation commands 54 to be performed using the qubit 32.

Upon receiving the push notification 46, the push notification service 44 obtains write access to the qubit 32. This may be accomplished in some examples by the push notification service 44 accessing functionality of the qubit registry 34 to determine whether the qubit 32 is in an accessible state, and/or obtaining exclusive access to the qubit 32. In examples in which the identifier 48 comprises an identifier of the quantum service 30, operations for obtaining write access to the qubit 32 may include operations for first identifying the qubit 32 based on the identifier of the quantum service 30. The push notification service 44 then applies the push notification payload 50 to the qubit 32. Some examples in which the push notification payload 50 includes the data value 52, operations for applying the push notification payload 50 to the qubit 32 may comprise obtaining the data value 52 from the push notification payload 50, and then writing the data value 52 to the qubit 32. In examples in which the push notification payload 50 includes the one or more qubit manipulation commands 54, operations for applying the push notification payload 50 to the qubit 32 may comprise obtaining the one or more qubit manipulation commands 54 from the push notification payload 50, and then executing the one or more qubit manipulation commands 54 using the qubit 32.

According to some examples, the quantum computing device 12, after applying the push notification payload 50 to the qubit 32, may subsequently execute the quantum service 30 to which the qubit 32 is allocated. The push notification service 44 thus may be used to "daisy-chain" multiple quantum services, such that the results of one quantum service are pushed into the qubit 32 in preparation for further quantum computations by the quantum service 30.

It is to be understood that, because the push notification service 44 is a component of the quantum computing device 12, functionality implemented by the push notification service 44 may be attributed to the computing system 10 generally. Moreover, in examples where the push notification service 44 comprises software instructions that program the processor device 16 to carry out functionality discussed herein, functionality implemented by the push notification service 44 may be attributed herein to the processor device 16. It is to be further understood that while, for purposes of illustration only, the push notification service 44 is depicted as a single component, the functionality implemented by the push notification service 44 may be implemented in any number of components, and the examples discussed herein are not limited to any particular number of components. Additionally, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
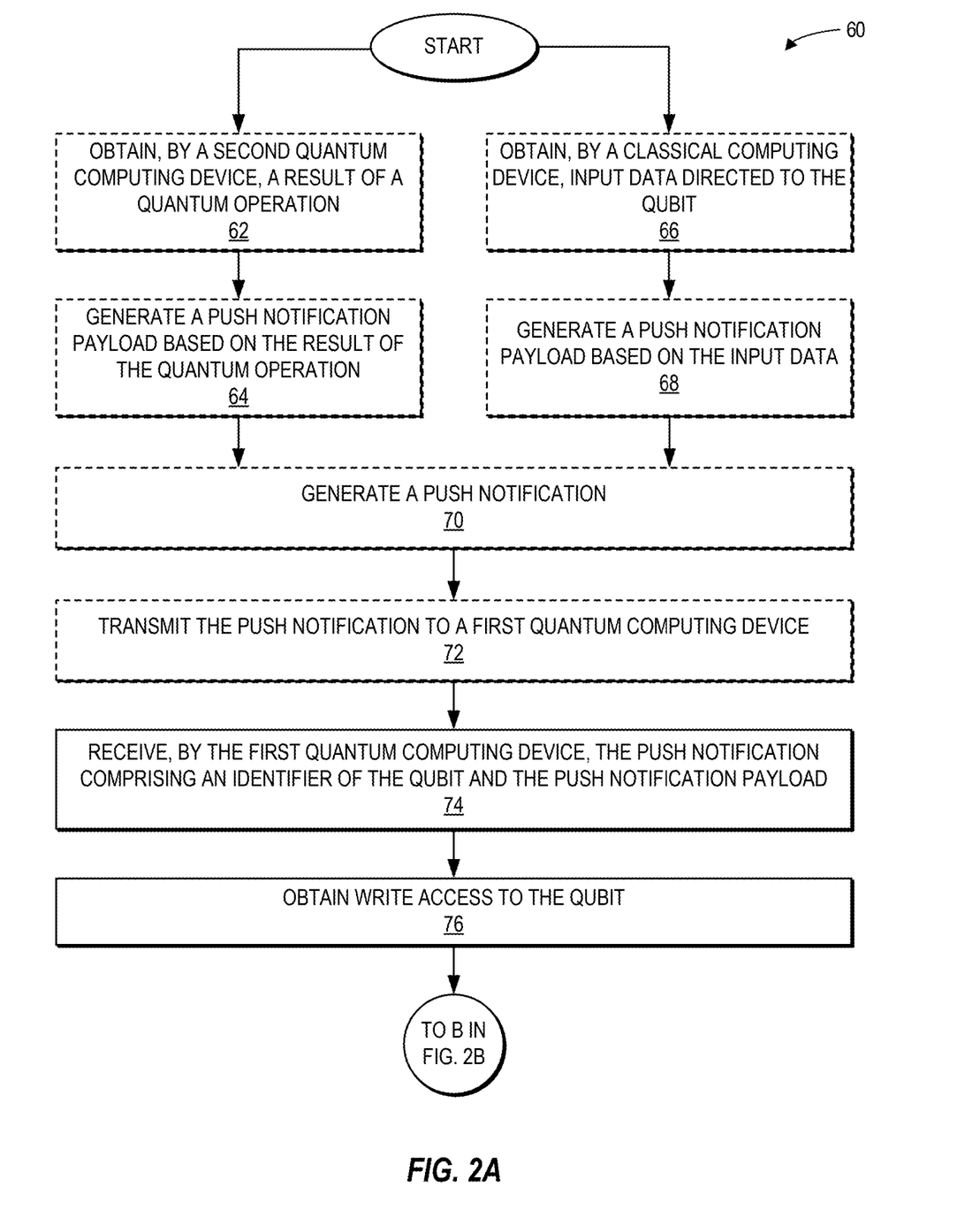
FIGS. 2A-2B are flowcharts illustrating operations performed by the computing system of FIG. 1 for performing qubit manipulation using push notifications, according to one example.
Figure 2B:
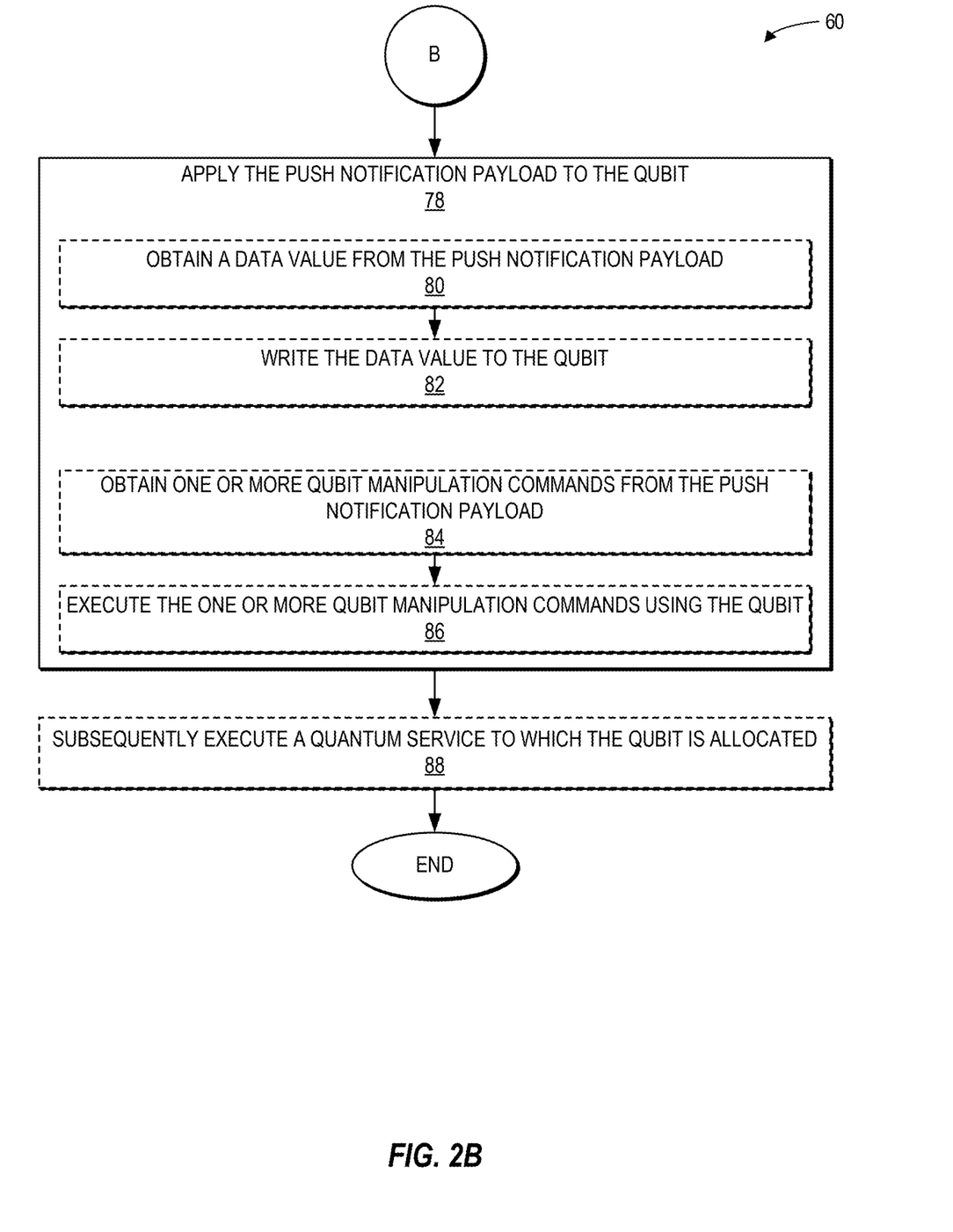

To illustrate exemplary operations performed by the computing system 10 of FIG. 1 for performing qubit manipulation using push notifications according to one example, FIGS. 2A and 2B provide a flowchart 60. Elements of FIG. 1 are referenced in describing FIGS. 2A and 2B for the sake of clarity. In FIG. 2A, operations begin in some examples with a quantum computing device (such as the quantum computing device 18 of FIG. 1, also referred to herein as the "second quantum computing device 18") obtaining a result of a quantum operation (such as the result 56 of FIG. 1) (block 62). The second quantum computing device 18 may then generate a push notification payload (e.g., the push notification payload 50 of FIG. 1) based on the result 56 of the quantum operation (block 64). Some examples may provide that operations begin with a classical computing device (such as the classical computing device 24 of FIG. 1) obtaining input data directed to a qubit (e.g., the input data 58 directed to the qubit 32 of FIG. 1) (block 66). The classical computing device 24 may then generate the push notification payload 50 based on the input data 58 (block 68).

The second quantum computing device 18 or the classical computing device 24, in their respective examples above, may then generate the push notification 46 (block 70). The second quantum computing device 18 or the classical computing device 24 may then transmit the push notification 46 to a quantum computing device (such as the quantum computing device 12 of FIG. 1, also referred to herein as the "first quantum computing device 12") (block 72).

The processor device 16 of the quantum computing device 12 (e.g., by executing the push notification service 44 of FIG. 1) receives the push notification 46 comprising an identifier (e.g., the identifier 48 of FIG. 1) of the qubit 32 and a push notification payload (e.g., the push notification payload 50 of FIG. 1) (block 74). The processor device 16 next obtains write access to the qubit 32 (block 76). This may be accomplished in some examples by accessing functionality provided by the quantum task manager 36, the quantum service scheduler 38, and/or the qubit registry 34 of FIG. 1. Operations then continue at block 78 of FIG. 2B.

Referring now to FIG. 2B, the processor device 16 applies the push notification payload 50 to the qubit 32 (block 78). In some examples, the operations of block 78 for applying the push notification payload 50 to the qubit 32 may include the processor device 16 obtaining a data value (e.g., the data value 52) from the push notification payload 50 (block 80). The processor device 16 may then write the data value 52 to the qubit 32 (block 82). Some examples may provide that the operations of block 78 for applying the push notification payload 50 to the qubit 32 comprise the processor device 16 obtaining one or more qubit manipulation commands (e.g., the qubit manipulation command(s) 54 of FIG. 1) from the push notification payload 50 (block 84). The processor device 16 may then execute the one or more qubit manipulation commands 54 using the qubit 32 (block 86). In some examples, the processor device 16 may subsequently execute a quantum service (e.g., the quantum service 30 of FIG. 1) to which the qubit 32 is allocated (block 88).

Figure 3:
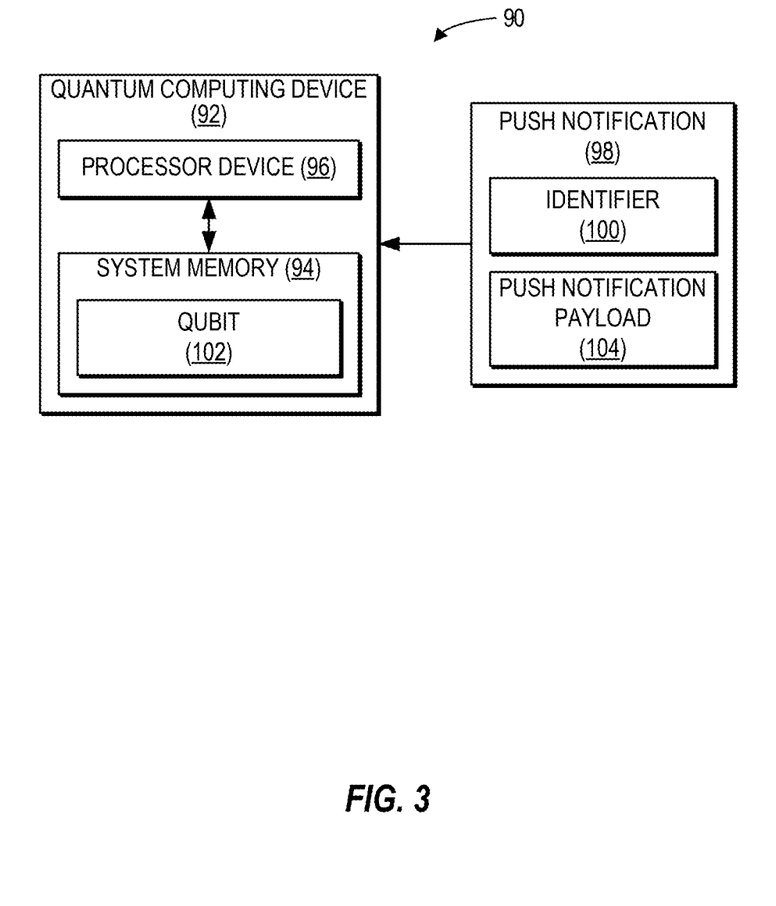
FIG. 3 is a simpler block diagram of the computing system of FIG. 1 for performing qubit manipulation using push notifications, according to one example.

FIG. 3 is a simpler block diagram of the computing system 10 of FIG. 1 for performing qubit manipulation using push notifications, according to one example. In the example of FIG. 3, a computing system 90 includes a quantum computing device 92 that comprises a system memory 94 and a processor device 96. In exemplary operation, the processor device 96 receives a push notification 98, which comprises an identifier 100 of a qubit 102 to which the push notification 98 is directed, and also includes a push notification payload 104. Upon receiving the push notification 98, the processor device 96 obtains write access to the qubit 102, and then applies the push notification payload 104 to the qubit 102.

Figure 4:
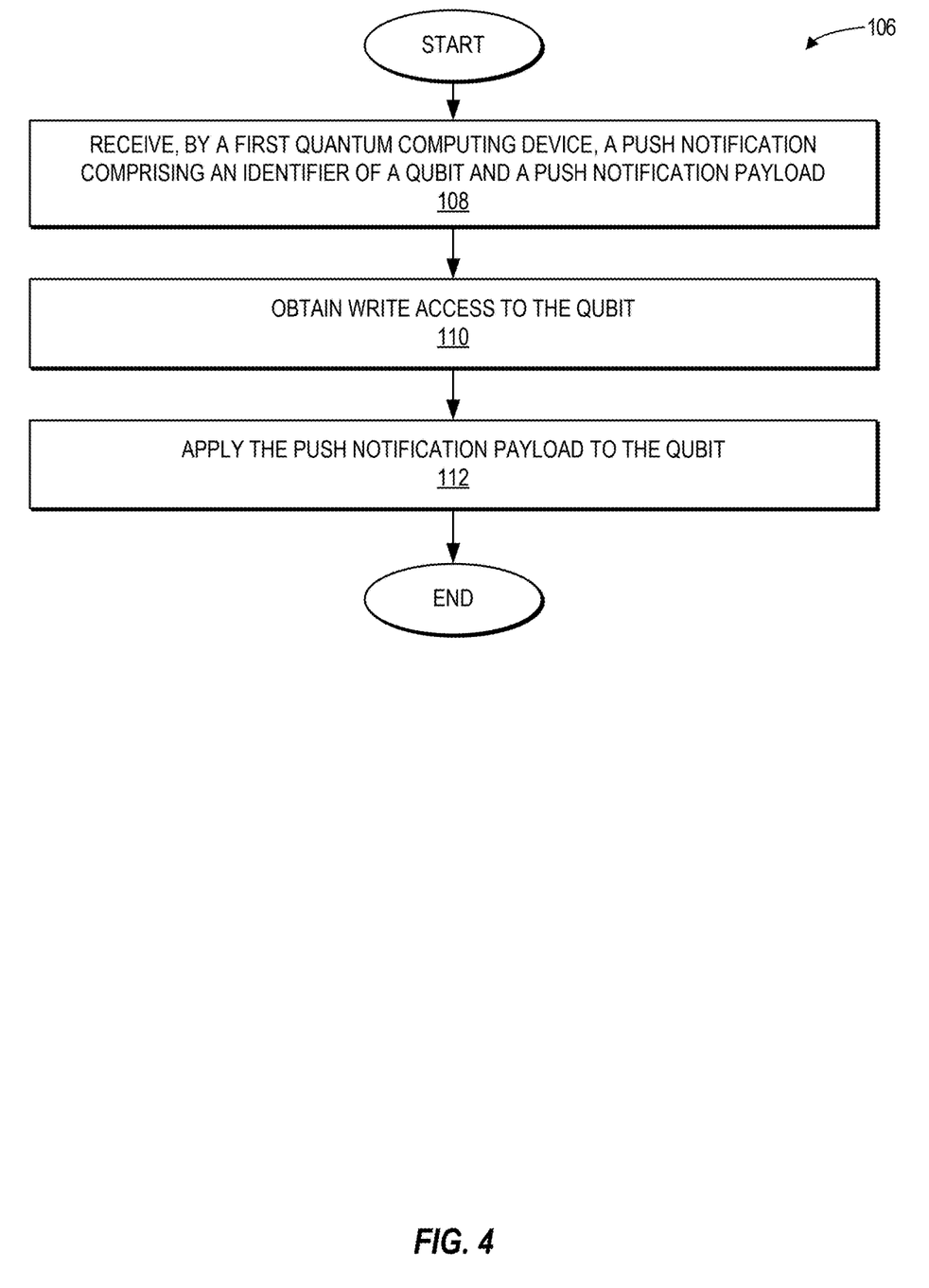
FIG. 4 is a flowchart of a simplified method for performing qubit manipulation using push notifications by the quantum computing device of FIG. 3, according to one example.

FIG. 4 provides a flowchart 106 of a simplified method for performing qubit manipulation using push notifications by the quantum computing device 92 of FIG. 3, according to one example. For the sake of clarity, elements of FIG. 3 are referenced in describing FIG. 4. Operations in FIG. 4 begin with the processor device 96 of the quantum computing device 92 receiving the push notification 98 comprising the identifier 100 of the qubit 102 and the push notification payload 104 (block 108). The processor device 96 next obtains write access to the qubit 102 (block 110). The processor device 96 then applies the push notification payload 104 to the qubit 102 (block 112).

Figure 5:
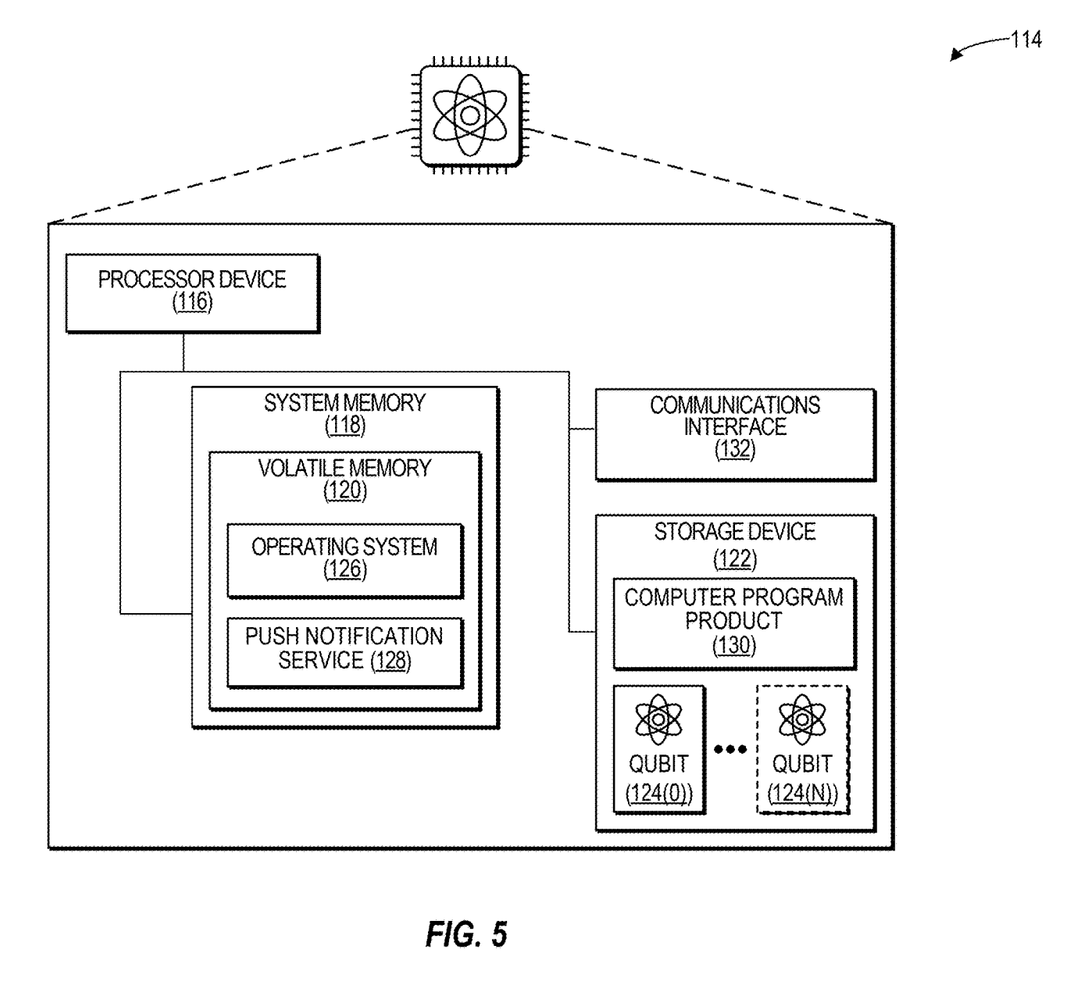
FIG. 5 is a block diagram of a quantum computing device suitable for implementing examples, according to one example.

FIG. 5 is a block diagram of a quantum computing device 114, such as the quantum computing device 12 of FIG. 1, suitable for implementing examples according to one example. The quantum computing device 114 may comprise any suitable quantum computing device or devices. The quantum computing device 114 can operate using classical computing principles or quantum computing principles. When using quantum computing principles, the quantum computing device 114 performs computations that utilize quantum-mechanical phenomena, such as superposition and entanglement. The quantum computing device 114 may operate under certain environmental conditions, such as at or near zero degrees (0°) Kelvin. When using classical computing principles, the quantum computing device 114 utilizes binary digits that have a value of either zero (0) or one (1).

The quantum computing device 114 includes a processor device 116 and a system memory 118. The processor device 116 can be any commercially available or proprietary processor suitable for operating in a quantum environment. The system memory 118 may include volatile memory 120 (e.g., random-access memory (RAM)). The quantum computing device 114 may further include or be coupled to a non-transitory computer-readable medium such as a storage device 122. The storage device 122 and other drives associated with computer-readable media and computer-usable media may provide non-volatile storage of data, data structures, computer-executable instructions, and the like. The storage device may also provide functionality for storing one or more qubits 124(0)-124(N).

A number of modules can be stored in the storage device 122 and in the volatile memory 120, including an operating system 126 and one or more modules, such as a push notification service 128. All or a portion of the examples may be implemented as a computer program product 130 stored on a transitory or non-transitory computer-usable or computer-readable medium, such as the storage device 122, which includes complex programming instructions, such as complex computer-readable program code, to cause the processor device 116 to carry out the steps described herein. Thus, the computer-readable program code can comprise computer-executable instructions for implementing the functionality of the examples described herein when executed on the processor device 116.

An operator may also be able to enter one or more manipulation commands through a keyboard (not illustrated), a pointing device such as a mouse (not illustrated), or a touch-sensitive surface such as a display device (not illustrated). The quantum computing device 114 may also include a communications interface 132 suitable for communicating with other quantum computing systems, including, in some implementations, classical computing devices.

Figure 6:
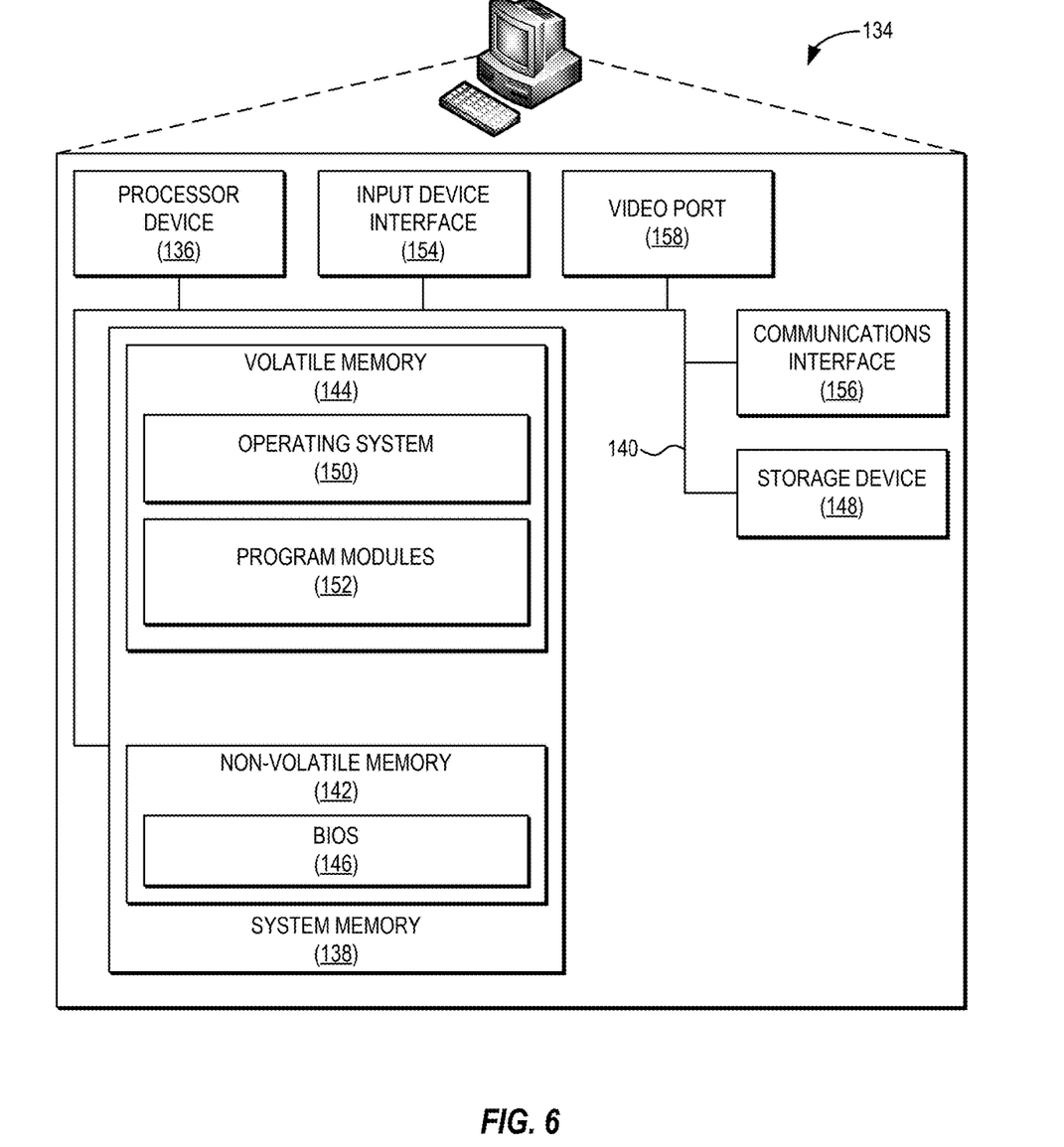
FIG. 6 is a block diagram of a classical computing device suitable for implementing examples, according to one example.

FIG. 6 is a block diagram of a processor-based computing device 134 ("computing device 134" or "classical computing device 134"), such as the classical computing device 24 of FIG. 1, suitable for implementing examples according to one example. The computing device 134 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 134 includes a processor device 136, a system memory 138, and a system bus 140. The system bus 140 provides an interface for system components including, but not limited to, the system memory 138 and the processor device 136. The processor device 136 can be any commercially available or proprietary processor.

The system bus 140 may be any of several types of bus structures that may further interconnect to a memory bus (with or without a memory controller), a peripheral bus, and/or a local bus using any of a variety of commercially available bus architectures. The system memory 138 may include non-volatile memory 142 (e.g., read-only memory (ROM), erasable programmable ROM (EPROM), electrically EPROM (EEPROM), etc.), and volatile memory 144 (e.g., RAM). A basic input/output system (BIOS) 146 may be stored in the non-volatile memory 142 and can include the basic routines that help to transfer information among elements within the computing device 134. The volatile memory 144 may also include a high-speed RAM, such as static RAM, for caching data.

The computing device 134 may further include or be coupled to a non-transitory computer-readable storage medium such as a storage device 148, which may comprise, for example, an internal or external hard disk drive (HDD) (e.g., enhanced integrated drive electronics (EIDE) or serial advanced technology attachment (SATA)), for storage, flash memory, or the like. The storage device 148 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 148 and in the volatile memory 144, including an operating system 150 and one or more program modules 152 which may implement the functionality described herein in whole or in part. It is to be appreciated that the examples can be implemented with various commercially available operating systems 150 or combinations of operating systems 150. All or a portion of the examples may be implemented as a computer program product stored on a transitory or non-transitory computer-usable or computer-readable storage medium, such as the storage device 148, which includes complex programming instructions, such as complex computer-readable program code, to cause the processor device 136 to carry out the steps described herein. Thus, the computer-readable program code can comprise software instructions for implementing the functionality of the examples described herein when executed on the processor device 136. The processor device 136 may serve as a controller, or control system, for the computing device 134 that is to implement the functionality described herein.

An operator may also be able to enter one or more manipulation commands through a keyboard (not illustrated), a pointing device such as a mouse (not illustrated), or a touch-sensitive surface such as a display device (not illustrated). Such input devices may be connected to the processor device 136 through an input device interface 154 that is coupled to the system bus 140 but can be connected by other interfaces, such as a parallel port, an Institute of Electrical and Electronic Engineers (IEEE) 1394 serial port, a Universal Serial Bus (USB) port, an IR interface, and the like.

The computing device 134 may also include a communications interface 156 suitable for communicating with a network as appropriate or desired. The computing device 134 may also include a video port 158 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a first quantum computing device, a push notification over a quantum channel, the push notification comprising an identifier of a first qubit and a push notification payload, the push notification payload comprising a second qubit transmitted over the quantum channel;
   obtaining write access to the first qubit; and
   applying the push notification payload to the first qubit.

2. The method of claim 1, further comprising subsequently executing a quantum service to which the first qubit is allocated.

3. The method of claim 1, wherein:
   the push notification payload comprises one or more qubit manipulation commands; and
   applying the push notification payload to the first qubit comprises:
      obtaining the one or more qubit manipulation commands from the push notification payload; and
      executing the one or more qubit manipulation commands using the first qubit.

4. The method of claim 3, wherein the one or more qubit manipulation commands comprises one or more of a command for placing the first qubit into an entangled state and a command for setting a quantum state of the first qubit.

5. The method of claim 1, further comprising:
   obtaining, by a second quantum computing device, a result of a quantum operation;
   generating the push notification payload based on the result of the quantum operation;
   generating the push notification; and
   transmitting the push notification to the first quantum computing device.

6. The method of claim 1, further comprising:
   obtaining, by a classical computing device, input data directed to the first qubit;
   generating the push notification payload based on the input data;
   generating the push notification; and
   transmitting the push notification to the first quantum computing device.

7. A computing system, comprising:
   a first quantum computing device, comprising:
      a first system memory; and
      a first processor device communicatively coupled to the first system memory, the first processor device to:
         receive a push notification over a quantum channel, the push notification comprising an identifier of a first qubit and a push notification payload, the push notification payload comprising a second qubit transmitted over the quantum channel;
         obtain write access to the first qubit; and
         apply the push notification payload to the first qubit.

8. The computing system of claim 7, wherein the first processor device is further to subsequently execute a quantum service to which the first qubit is allocated.

9. The computing system of claim 7, wherein:
   the push notification payload comprises one or more qubit manipulation commands; and
   to apply the push notification payload to the first qubit is to:
      obtain the one or more qubit manipulation commands from the push notification payload; and
      execute the one or more qubit manipulation commands using the first qubit.

10. The computing system of claim 9, wherein the one or more qubit manipulation commands comprises one or more of a command for placing the first qubit into an entangled state and a command for setting a quantum state of the first qubit.

11. The computing system of claim 7, further comprising:
   a second quantum computing device, comprising:
      a second system memory; and a second processor device communicatively coupled to the second system memory, the second processor device to:
   obtain a result of a quantum operation;
   generate the push notification payload based on the result of the quantum operation;
   generate the push notification; and
   transmit the push notification to the first quantum computing device.

12. The computing system of claim 7, further comprising:
a classical computing device, comprising:
   a third system memory; and
   a third processor device communicatively coupled to the third system memory, the third processor device to:
      obtain input data directed to the first qubit;
      generate the push notification payload based on the input data;
      generate the push notification; and
      transmit the push notification to the first quantum computing device.

13. A non-transitory computer-readable medium having stored thereon computer-executable instructions that, when executed, cause one or more processor devices to:
   receive a push notification over a quantum channel, the push notification comprising an identifier of a first qubit and a push notification payload, the push notification payload comprising a second qubit transmitted over the quantum channel;
   obtain write access to the first qubit; and
   apply the push notification payload to the first qubit.

14. The non-transitory computer-readable medium of claim 13, wherein:
   the push notification payload comprises one or more qubit manipulation commands; and
   to apply the push notification payload to the first qubit is to:
      obtain the one or more qubit manipulation commands from the push notification payload; and
      execute the one or more qubit manipulation commands using the first qubit.

15. The non-transitory computer-readable medium of claim 14, wherein the one or more qubit manipulation commands comprises one or more of a command for placing the first qubit into an entangled state and a command for setting a quantum state of the first qubit.

16. The non-transitory computer-readable medium of claim 13, wherein the computer-executable instructions further cause the one or more processor devices to:
   obtain a result of a quantum operation;
   generate the push notification payload based on the result of the quantum operation;
   generate the push notification; and
   transmit the push notification.

17. The non-transitory computer-readable medium of claim 13, wherein the computer-executable instructions further cause the one or more processor devices to:
   obtain input data directed to the first qubit;
   generate the push notification payload based on the input data;
   generate the push notification; and
   transmit the push notification.

* * * * *